(12) United States Patent
Crafts

(10) Patent No.: US 6,556,764 B2
(45) Date of Patent: Apr. 29, 2003

(54) APPARATUS AND METHOD FOR HOLDING AN OPTICAL FIBER COMPONENT DURING OPTICAL FIBER ALIGNMENT

(75) Inventor: Douglas E. Crafts, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/818,804

(22) Filed: Mar. 27, 2001

(65) Prior Publication Data

US 2002/0141722 A1 Oct. 3, 2002

(51) Int. Cl.[7] .................................................. G02B 6/00
(52) U.S. Cl. ........................................ 385/136; 385/137
(58) Field of Search ................................ 385/134, 136, 385/137, 135

(56) References Cited

U.S. PATENT DOCUMENTS

| | | | | |
|---|---|---|---|---|
| 5,283,853 A | * | 2/1994 | Szegda | 385/139 |
| 5,677,975 A | * | 10/1997 | Burek et al. | 385/136 |
| 5,937,123 A | * | 8/1999 | Frelier | 385/79 |
| 6,193,421 B1 | * | 2/2001 | Tamekuni et al. | 385/65 |
| 6,226,437 B1 | * | 5/2001 | Kikuchi et al. | 385/136 |
| 2001/0036352 A1 | * | 11/2001 | Kadar-Kallen et al. | 385/136 |

* cited by examiner

*Primary Examiner*—Lynn D. Feild
*Assistant Examiner*—Michael C. Zarroli
(74) *Attorney, Agent, or Firm*—Blakely, Sokoloff, Taylor & Zafman LLP

(57) ABSTRACT

An apparatus and a method for holding and aligning a fiber optic component. One embodiment includes a collimator tube with a collar to house a portion of an optical fiber, and a clamping device coupled to a support structure to support the collar. The clamping device applies a normal force to the collar when the collar is disposed between the clamping device and the support structure, releasably coupling the collar to the support structure. After alignment, the collar can be affixed to the support structure with epoxy in a manner that reduces or eliminates misalignment caused by curing of the epoxy.

26 Claims, 3 Drawing Sheets

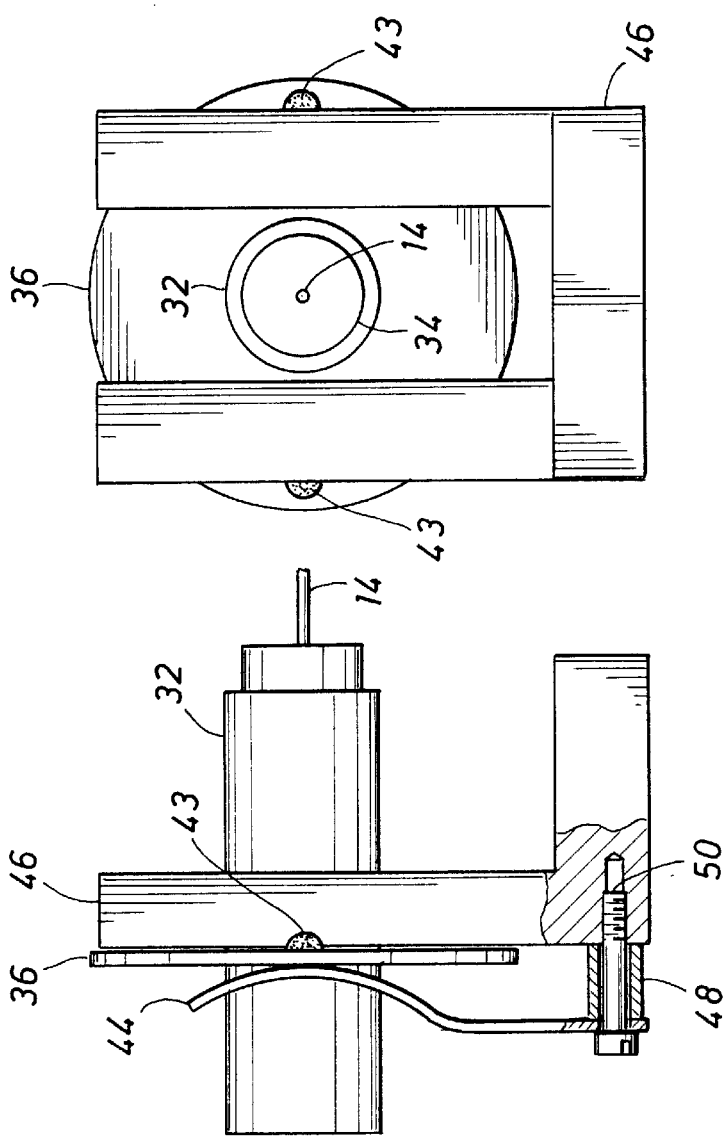
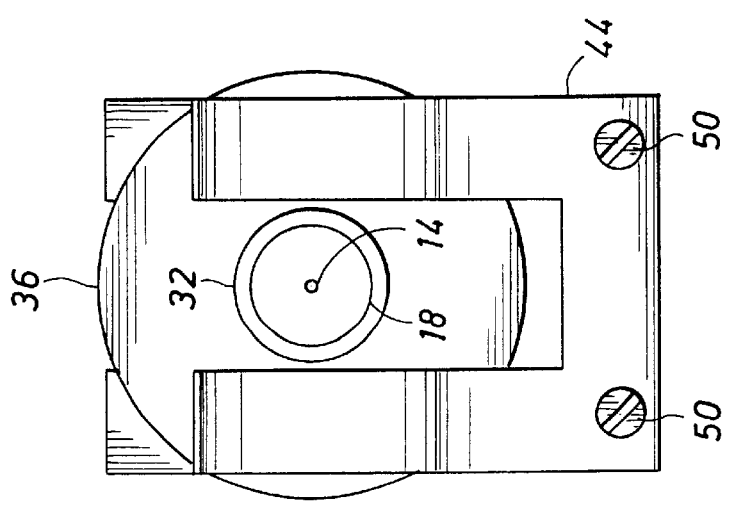
FIG. 2C  FIG. 2B  FIG. 2A

APPARATUS AND METHOD FOR HOLDING AN OPTICAL FIBER COMPONENT DURING OPTICAL FIBER ALIGNMENT

FIELD OF THE INVENTION

The present invention relates to fiber optic light transmission. In particular, the present invention relates to an apparatus and a method for holding a fiber optic component during optical fiber alignment.

BACKGROUND OF THE INVENTION

Optical fibers are a medium though which light signals can travel. Light signals can travel through optical fibers over long distances. However, as the distance increases, the light signal begins to experience a loss in optical power and intensity. To compensate for this loss, the light signal from the optical fiber may be input to a wave guide amplifier. The wave guide amplifier supplies energy to the light signal, increasing the optical power and intensity of the light signal. At the output of the wave guide amplifier, a second optical fiber is positioned in alignment with the wave guide amplifier to receive the reenergized light signal.

In order for the light amplification to be successful, the optical fiber containing the diminished light (the input optical fiber) should be aligned with the core of the wave guide amplifier and the core of the wave guide amplifier should, in turn, be aligned with the optical fiber receiving the amplified light (the output optical fiber). One solution is to align the input and output optical fibers with the amplifier and then glue the fibers into position with an epoxy. A problem with this technique is that in some instances the epoxy cures unevenly and pulls the input and/or output optical fibers out of alignment with the optical amplifier. In addition, in this technique, the only support to the underside of the input and output optical fibers comes from the epoxy itself, allowing the optical fibers to shift out of alignment with the optical amplifier before and/or during the curing of the epoxy.

BRIEF DESCRIPTION OF THE DRAWINGS

The present invention is illustrated by way of example and is not limited by the accompanying figures:

FIG. 2A is a front view of an embodiment of an apparatus for holding an optical fiber component during optical fiber alignment.

FIG. 2B is a side view of the apparatus of FIG. 2A.

FIG. 2C is a back view of the apparatus of FIG. 2A.

DETAILED DESCRIPTION OF THE INVENTION

The description discloses an apparatus and a method for holding an optical fiber component during optical fiber alignment. Embodiments of the invention include an apparatus and a method for holding an optical fiber component during optical fiber alignment that reduces or eliminates a pre-curing shift and/or a post-curing shift of the optical fiber component. Various embodiments reduce or eliminate pre-curing shifts and/or post-curing shifts of the optical fiber component during optical fiber alignment by applying approximately equal amounts of epoxy on each side of the optical fiber component and by using an adjustable structure rather than the epoxy itself to support the optical fiber component during epoxy curing. The following detailed description contains numerous specific details in order to provide a more thorough understanding of the present invention. However, it will be apparent to those skilled in the art to which this invention pertains that the present invention may be practiced without these specific details. In other instances, well-known devices, methods, procedures, and individual components have not been described in detail in order to avoid obscuring the present invention.

Figure 1:
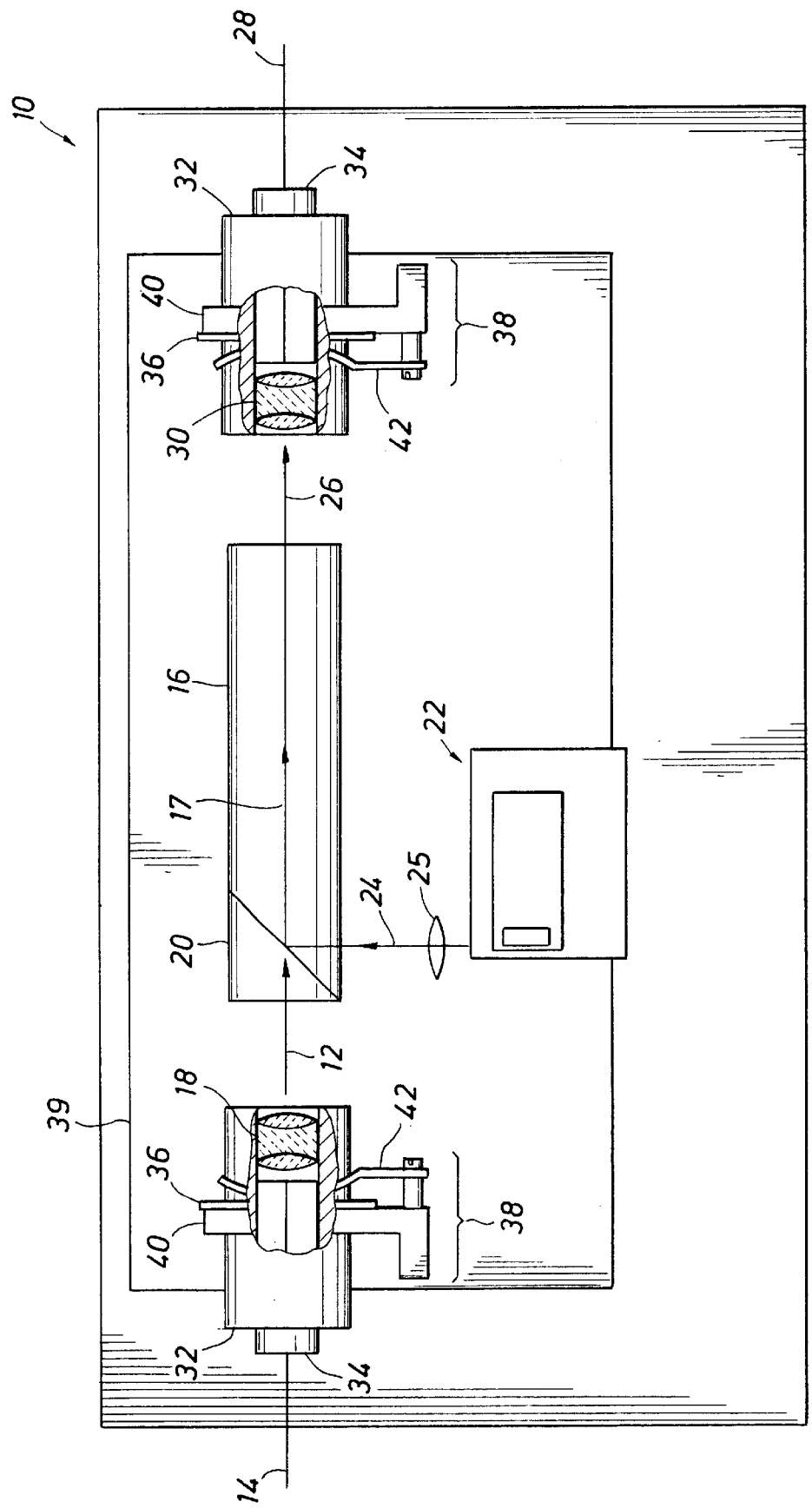
FIG. 1 is a top view of an embodiment of an optical amplifier system.

FIG. 1 shows an embodiment of an optical amplifier system 10. To amplify the optical power and intensity of an input light signal 12 from an input optical fiber 14, the input light signal 12 is aligned with a wave guide amplifier 16. The wave guide amplifier 16 is comprised of, for example, polished glass having a core 17 capable of transmitting a light signal. Typically, the wave-guide amplifier 16 is comprised of a phosphate glass core encapsulated by silica glass. The input light signal 12 is focused by a collimating lens 18, directing the input light signal 12 to the core 17 of the wave guide amplifier 16.

A prism 20 can be attached to the wave guide amplifier 16. In this embodiment, the prism 20 has a surface that faces the input light signal 12 and an underside surface that faces a laser diode pump 22 at an angle. The surface of the prism 20 that faces the input signal 12 may be coated with an anti-reflective coating. The anti-reflective coating can be chosen such that it allows the wavelength of light of the input signal 12 to pass through its surface with only a minimal loss in optical power and intensity. The underside surface of the prism 20 can be coated with a reflective coating or a filter coating. In one example, a filter coating is chosen such that it allows the wavelength of the input light signal 12 to pass through its surface and enter the core 17 of the wave guide amplifier 16, and reflects the wavelength of light of a beam 24 off of the underside surface of the prism 20 and into the core 17 of the wave guide amplifier 16 (the beam 24 emanates from the laser diode pump 22 into a focusing lens 25 which directs the beam 24 onto the underside surface of the prism 20). As a result, when the input light signal 12 and the beam 24 are aligned with the wave guide amplifier 16, both the input light signal 12 and the beam 24 are directed into the core 17 of the wave guide amplifier 16. When the beam 24 engages the input light signal 12 in the core 17 of the wave guide amplifier 16, the beam 24 excites the atoms in the wave guide amplifier 16 at the specific wavelength of the input light signal 12 to increase the optical power and intensity of the input light signal 12. Thus, the light signal that emerges from the wave guide amplifier 16, an output light signal 26, has a greater value of optical power and intensity than the input light signal 12, and may reenter an optical fiber such as an output optical fiber 28.

As with the input optical fiber 14, the output optical fiber 28 can be aligned with the wave guide amplifier 16 such that a collimating lens 30 focuses the output light signal 26, directing the output light signal 26 into the output optical fiber 28.

To align the input light signal 12 with the wave guide amplifier 16, a mounting apparatus 38 and a collimator tube 32 may be used. Within the collimator tube 32 is an optical fiber capillary 34 which encompasses a portion of the input optical fiber 14. The optical fiber capillary 34 provides an area for attachment to the collimator tube 32 and protects the end of the optical fiber 14. In addition, the optical fiber capillary 34 provides a surface to polish the end to the optical fiber 14 giving the optical fiber 14 a better optical finish. The collimator tube 32 can also house the collimator lens 18 and collimates the input light signal 12 with the collimator lens 18.

In the illustrated embodiment, an outer surface of the collimator tube 32 has a collar 36. In one embodiment, the collar 36 is an integral part of the collimator tube 32 formed by machining a bar stock of stainless steel on a lathe to form the shape of the collimator tube 32 shown in FIG. 1 (and again in FIGS. 2–4), although other methods and materials may be used. The collar 36 is used as an attachment surface for the mounting apparatus 38, which mounts the collimator tube 32 to a mounting base 39. Typically, the wave guide amplifier 16 is mounted to the mounting base 39 before the collimator tube 32 is mounted to the mounting base 39 since the wave guide amplifier 16 is to be aligned with both the input optical fiber 14 and the output optical fiber 28, although the order of mounting can be rearranged.

The input light signal 12 can be aligned with the core 17 of the wave guide amplifier 16 by first mounting the mounting apparatus 38 to the mounting base 39. In this embodiment, the mounting apparatus 38 is comprised of a support structure 40 and a clamping device 42. The clamping device 42 is coupled to the support structure 40 and the support structure 40 is affixed to the mounting base 39 by any one of various methods including bonding, spot welding or mechanical mounting devices such as screws. When the support structure 40 is mounted to the mounting base 39, the collar 36 of the collimator tube 32 can be slid between the clamping device 42 and the support structure 40. The clamping device 42 applies, in this instance, a force that is normal to the collar 36, releasably coupling the collar 36 to the support structure 40 to allow the collimating tube 32 to be adjusted laterally and/or vertically to align the input light signal 12 with the core 17 of the wave guide amplifier 16.

The support structure 40 and the clamping device 42 can have an open portion to allow the input light signal 12 to travel from the input optical fiber 14 to the core 17 of the wave guide amplifier 16. In one embodiment, the support structure 40 and the clamping device 39 define a U-shaped body allowing the collimator tube 32 and the input optical fiber 14 to be positioned within the open portion of the U-shaped body so that the input light signal 12 can be positioned in alignment with the core 17 of the wave guide amplifier 16.

After the input light signal 12 is aligned with the core 17 of the wave guide amplifier 16, the collar 36 is affixed to the support structure 40. In one embodiment, the collar 36 is affixed to the support structure 40 by bonding the collar 36 to the support structure 40 with an epoxy 43 (shown in FIGS. 2B–2C). The epoxy 43 can be applied to the collar 36 and support structure 40 in at least two locations, wherein each epoxy 43 application is approximately 180° apart, and the volume of epoxy 43 is approximately equal on each side of the support structure 40. In one embodiment, the epoxy 43 is applied to the collar 36 and the support structure 40 by use of a syringe and the volume of epoxy 43 on each side of the support structure 40 is plus or minus 25% of the volume of the epoxy 43 on the approximately 180° opposite side of the support structure 40. The epoxy is then cured, for example by flood curing.

An advantage of this embodiment is that during the epoxy curing, the collimator tube 32 is supported by the support structure 40 and the clamping device 42, rather than by the epoxy itself. The clamping device 42 applies a normal force to the collar 36 producing frictional forces between the collar 36 and the support structure 40, the normal force and frictional forces reduce or eliminate lateral or vertical movements by the collimator tube 32 that could pull the input light signal 12 out of alignment with the core 17 of the wave guide amplifier 16.

In addition, although it is possible in this embodiment for the epoxy 43 to exert a force on the collimator tube 32 during curing that is large enough to overcome the normal force and the frictional forces exerted on the collimator tube 32 by the clamping device 42 and the support structure 40, the epoxy 43 forces will merely impart a stress on the collimator tube 32 rather than induce a movement. This is because each epoxy 43 application is spaced approximately 180° apart and the volume of epoxy 43 on each side of the support structure 40 is approximately equal. Therefore, any force produced by the epoxy 43 on one side of the support structure 40 will be approximately equal and opposite to the force produced by the epoxy 43 on the approximately 180° opposite side of the support structure 40.

Although the above description describes the mounting of the input optical fiber 14, it is appreciated that the mounting of the output optical fiber 28 may be accomplished in a similar manner.

FIGS. 2A–2C show an embodiment of the invention wherein the clamping device 42 (referred to in FIG. 1) includes a spring 44 and the support structure 40 includes an L-bracket 46. The L-bracket 46 can be mounted to the mounting base 39 as is described above for the mounting of the support structure 40 (see FIG. 1). The spring 44 can be attached to the L-bracket 46 by one of a variety of methods including spot welding, bonding or mounting with mechanical devices. In one embodiment, the spring 44 is attached to the L-bracket 46 by positioning a spacer 48 between the spring 44 and the L-bracket 46, wherein the spacer 48 houses a screw 50 that attaches the spring 44 to the L-bracket 46. The spring 44 is attached to the L-bracket 46 to allow the collar 36 of the collimator tube 32 to be positioned between the spring 44 and the L-bracket 46 such that the spring 44 applies a normal force to the collar 36, releasably coupling the collar 36 to the L-bracket 46 to allow the collimating tube 32 to be adjusted laterally and/or vertically to align the input light signal 12 with the core 17 of the waveguide amplifier 16.

After the input light signal 12 is aligned with the core 17 of the wave guide amplifier 16, the collar 36 can be affixed to the L-bracket 46. In one embodiment, the collar 36 is affixed to the support structure 40 by bonding the collar 36 to the support structure 40 with the epoxy 43 as is described above for the bonding of the collar 36 to the support structure 40.

Figure 3A:
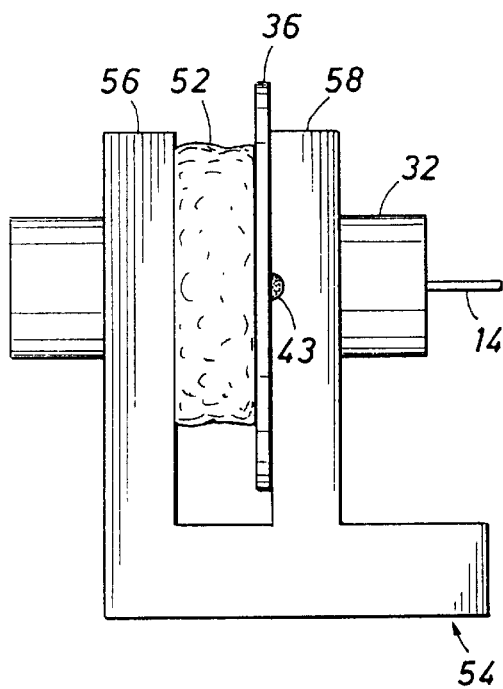
FIG. 3A is a side view of a second embodiment of an apparatus for holding an optical fiber component during optical fiber alignment.
Figure 3B:
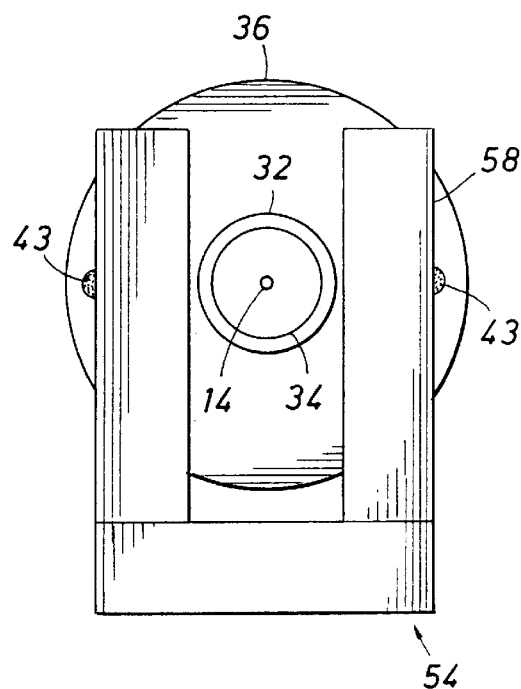
FIG. 3B is a back view of the apparatus of FIG. 3A.

FIGS. 3A–3B show another embodiment of an apparatus for holding an optical fiber wherein the clamping device 38 includes an elastomer 52 and the support structure 40 includes a double L-bracket 54. The double L-bracket 54 is mounted to the mounting base 39 as is described above for the mounting of the support structure 40. The double L-bracket 54 has a first vertical portion 56 and a second vertical portion 58. The elastomer 52 is positioned between the first vertical portion 56 and the second vertical portion 58. The elastomer 52 is attached to the first vertical portion 56, for example by using an epoxy, but is not attached to the second vertical portion 58 to allow the collar 36 of the collimator tube 32 to be positioned between the elastomer 52 and the second vertical portion 58. In this arrangement, the elastomer 52 applies a normal force to the collar 36, releasably coupling the collar 36 to the second vertical portion 58 to allow the collimating tube 32 to be adjusted laterally and/or vertically to align the input light signal 12 with the core 17 of the wave guide amplifier 16.

The elastomer 52 and the first and second vertical portions 56 and 58, respectively, have an open portion to allow the input light signal 12 to travel from the input optical fiber 14 to the core 17 of the wave guide amplifier 16. In one embodiment, the elastomer 52 and the first and second vertical portions 56 and 58 define a U-shaped body allowing the collimator tube 32 and the input optical fiber 14 to be positioned within the open portion of the U-shaped body so that the input light signal 12 can be positioned in alignment with the core 17 of the wave guide amplifier 16.

After the input light signal 12 is aligned with the core 17 of the wave guide amplifier 16, the collar 36 is affixed to the second vertical portion 58. In one embodiment, the collar 36 is affixed to the second vertical portion 58 by bonding the collar 36 to the second vertical portion 58 with an epoxy 43 as is described above for the bonding of the collar 36 to the support structure 40.

Figure 4A:
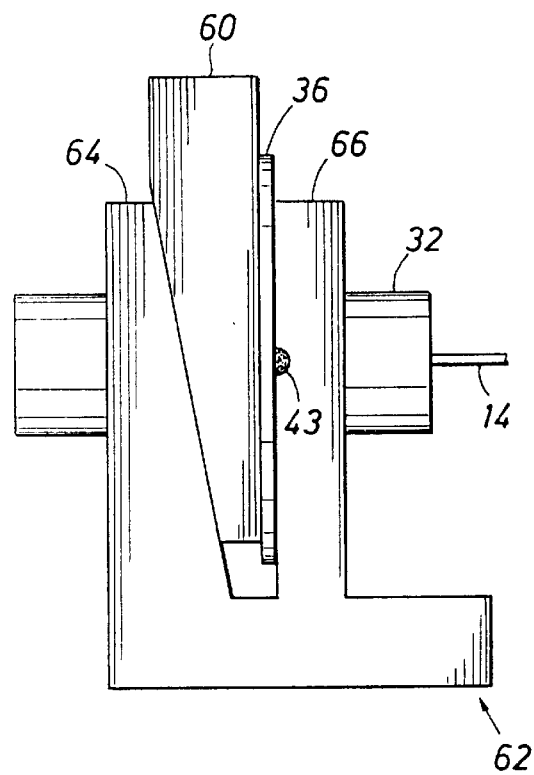
FIG. 4A is a side view of another embodiment of an apparatus for holding an optical fiber component during optical fiber alignment.
Figure 4B:
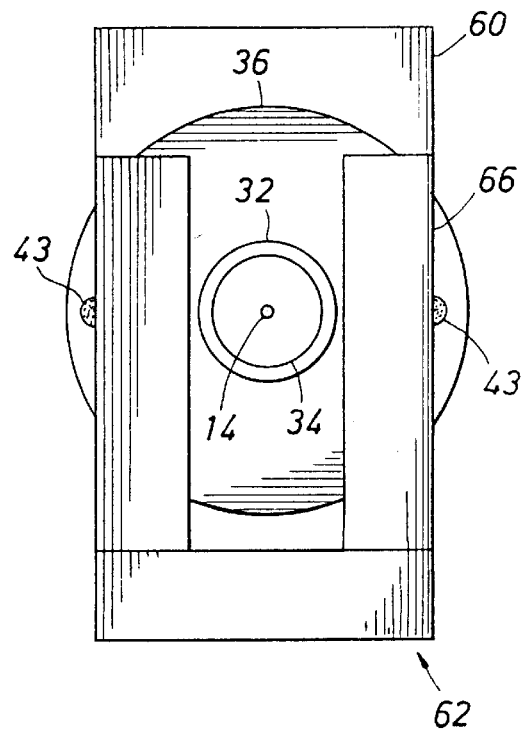
FIG. 4B is a back view of the apparatus of FIG. 4A.

FIGS. 4A–4B show a further embodiment of an apparatus for holding an optical fiber wherein the clamping device 38 includes a wedge 60 and the support structure 40 includes a double L-bracket 62. The double L-bracket 62 is mounted to the mounting base 39 as described above for the mounting of the support structure 40. The double L-bracket 62 has a first vertical portion 64 and a second vertical portion 66, the first vertical portion 62 being configured to slidably contact the wedge 60. The wedge 60 is slidably coupled to the first vertical portion 64, but is not coupled to the second vertical portion 66 to allow the collar 36 of the collimator tube 32 to be positioned between the wedge 60 and the second vertical portion 66. In this arrangement, the wedge 60 applies a normal force to the collar 36, releasably coupling the collar 36 to the second vertical portion 66 to allow the collimating tube 32 to be adjusted laterally and/or vertically to align the input light signal 12 with the core 17 of the wave guide amplifier 16.

The wedge 60 and the first and second vertical portions 64 and 66 have an open portion to allow the input light signal 12 to travel from the input optical fiber 14 to the core 17 of the wave guide amplifier 16. In one embodiment, the wedge 60 and the first and second vertical portions 64 and 66, respectively, define a U-shaped body allowing the collimator tube 32 and the input optical fiber 14 to be positioned within the open portion of the U-shaped body so that the input light signal 12 can be positioned in alignment with the core 17 of the wave guide amplifier 16.

In one embodiment, after the input light signal 12 is aligned with the core 17 of the wave guide amplifier 16, the collar 36 is affixed to the second vertical portion 66. In one embodiment, the collar 36 is affixed to the second vertical portion 66 by bonding the collar 36 to the second vertical portion 66 with the epoxy 43 as is described above for the bonding of the collar 36 to the support structure 40.

Although specific embodiments, including specific parameters, methods, and materials have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

I claim:

1. An apparatus comprising:
    a collimator tube having a collar, the collimator tube housing a portion of an optical fiber;
    a support structure to support the collar; and
    a U-shaped clamping device releasably coupling the collar to the support structure to permit the collimator tube to be adjusted laterally; the clamping device having an opening such that a portion of the clamping device applies a force normal to the collar, releasably coupling the collar to the support structure such that the collar may move relative to the clamping device and the support structure to allow the optical fiber disposed in the opening to be positioned in alignment with an optical amplifier.

2. The apparatus of claim 1, wherein the collar is affixed to the support structure after the optical fiber is positioned in alignment with the optical amplifier.

3. The apparatus of claim 2, wherein the collar is affixed to the support structure using an epoxy.

4. The apparatus of claim 3, wherein the epoxy holds the collar to the support structure in at least two locations, which are approximately 180° apart.

5. The apparatus of claim 1, wherein the support structure comprises an L-bracket and the clamping device comprises a spring arm positioned adjacent to the L-bracket such that the spring arm applies a normal force to the collar when the collar is disposed between the spring arm and the L-bracket.

6. The apparatus of claim 1, wherein the support structure comprises a double L-bracket and the clamping device comprises an elastomer, the elastomer being disposed between a first vertical portion and a second vertical portion of the double L-bracket.

7. The apparatus of claim 1, wherein the support structure comprises a double L-bracket and the clamping device comprises a wedge, the wedge being disposed between a first vertical portion and a second vertical portion of the double L-bracket and being in slidable contact with the first vertical portion.

8. An apparatus comprising:
    a collimator tube having a collar, the collimator tube housing a portion of an optical fiber;
    a support structure to support the collar; and
    a spring coupled to the support structure to apply a normal force to the collar when the collar is disposed between the spring and the support structure, the spring releasably coupling the collar to the support structure to allow the collar to move laterally relative to the spring and the support structure, and to allow the optical fiber to be positioned in alignment with an optical amplifier, the spring having an open portion to accommodate the optical fiber.

9. The apparatus of claim 8, wherein the collar is affixed to the support structure with an epoxy after the optical fiber is positioned in alignment with the optical amplifier, wherein the epoxy holds the collar to the support structure in at least two locations approximately 180° apart.

10. The apparatus of claim 8, wherein the support structure comprises an L-bracket, and a spacer is disposed between the L-bracket and the spring.

11. An apparatus comprising:
    a collimator tube having a collar, the collimator tube housing a portion of an optical fiber;
    a support structure, to support the collar; and an elastomer coupled to the support structure to apply a normal force to the collar when the collar is disposed between the elastomer and the support structure, the elastomer releasably coupling the collar to the support structure to allow the collar to move relative to the elastomer and the support structure and to allow the optical fiber to be positioned in alignment with an optical amplifier, the elastomer having an open portion to accommodate the optical fiber.

12. The apparatus of claim 11, wherein the support structure comprises a double L-bracket having a first vertical portion and a second vertical portion, the elastomer being disposed between the first and second vertical portions of the double L-bracket.

13. The apparatus of claim 12, wherein the elastomer is affixed to the first vertical portion but not affixed to the second vertical portion, the elastomer applying a normal force to the collar when the collar is disposed between the elastomer and the double L-bracket, releasably coupling the collar with the second vertical portion of the double L-bracket.

14. An apparatus comprising:
a collimator tube having a collar, the collimator tube housing a portion of an optical fiber,
a support structure to support the collar; and
a wedge slidably coupled to the support structure to apply a normal force to the collar when the collar is disposed between the wedge and the support structure, the wedge releasably coupling the collar to the support structure to allow the collar to move relative to the wedge and the support structure and to allow the optical fiber to be positioned in alignment with an optical amplifier, the wedge having an open portion to accommodate the optical fiber.

15. The apparatus of claim 14, wherein the support structure is a double L-bracket having a first vertical portion and a second vertical portion, the wedge being disposed between the first and second vertical portions of the double L-bracket and being in slidable contact with the first vertical portion.

16. The apparatus of claim 15, wherein the wedge is slidably coupled to the first vertical portion, the wedge applying a normal force to the collar when the collar is disposed between the wedge and the double L-bracket, releasably coupling the collar with the second vertical portion of the double L-bracket.

17. A method comprising:
coupling a support structure to a mounting base;
coupling a clamping device to the support structure;
positioning a collar of a collimator tube between the clamping device and the support structure;
applying a normal force from the clamping device to the collar when the collar is disposed between the clamping device and the support structure, releasably coupling the collar to the support structure;
aligning an optical fiber in the collimator tube with an optical amplifier by moving the collar laterally; and
affixing the collar to the support structure.

18. The method of claim 17, wherein moving the collar relative to the clamping device and the support structure to position the optical fiber in alignment with the optical amplifier.

19. The method of claim 18, further comprising affixing the collar to the support structure after the optical fiber is positioned in alignment with the optical amplifier.

20. The method of claim 19, wherein affixing includes affixing the collar to the support structure using an epoxy.

21. The method of claim 20, wherein affixing includes affixing the collar to the support structure in at least two locations approximately 180° apart.

22. The method of claim 21, wherein affixing includes flood curing after positioning.

23. A method comprising:
coupling a collar to a light collimator having an optical fiber;
securing the collar to a support structure;
aligning the optical fiber with an optical amplifier by adjusting the collar laterally with respect to the support structure; and
affixing the collar and the support structure.

24. The method of claim 23, wherein the affixing comprises applying an epoxy in a symmetrical pattern with respect to the optical fiber.

25. The method of claim 24, wherein the epoxy is applied to the collar and the support structure in at least two locations, which are approximately 180° apart.

26. The method of claim 25, wherein the epoxy is flood cured.

* * * * *

UNITED STATES PATENT AND TRADEMARK OFFICE
CERTIFICATE OF CORRECTION

PATENT NO. : 6,556,764 B2
DATED : April 29, 2003
INVENTOR(S) : Crafts

It is certified that error appears in the above-identified patent and that said Letters Patent is hereby corrected as shown below:

<u>Column 4,</u>
Between lines 49 and 50, insert -- The spring 44 and the L-bracket 46 have an open portion to allow the input light signal 12, referred to in Fig. 1, to travel from the input optical fiber 14 to the core 17 of the wave guide amplifier 16. In one embodiment, the spring 44 and the L-bracket 46 define a U- shaped body allowing the collimator tube 32 and the input optical fiber 14 to be positioned within the open portion of the U-shaped body so that the input light signal 12 can be positioned in alignment with the core 17 of the wave guide amplifier 16. --.

Signed and Sealed this

Sixteenth Day of September, 2003

JAMES E. ROGAN
*Director of the United States Patent and Trademark Office*